US005096648A

United States Patent [19]

Johnson et al.

[11] Patent Number: 5,096,648

[45] Date of Patent: Mar. 17, 1992

[54] METHOD OF MANUFACTURING PRECAST CONCRETE ARTICLES

[75] Inventors: David L. Johnson; Robert A. Johnson, both of Bonita Springs, Fla.

[73] Assignee: Johnson Brothers Precision Precast Products, Inc., Bonita Springs, Fla.

[21] Appl. No.: 227,689

[22] Filed: Aug. 3, 1988

[51] Int. Cl.[5] .......................... B28B 1/16; B28B 7/26; B28B 13/06; B29C 39/12

[52] U.S. Cl. .................................... 264/245; 211/126; 211/128; 211/134; 211/151; 249/120; 249/126; 249/133; 249/139; 264/256; 264/297.9; 264/334; 264/DIG. 31; 264/DIG. 57

[58] Field of Search ..................... 264/245, 256, 297.1, 264/297.4, 297.8, 297.9, 308, DIG. 57, 334, DIG. 31; 249/120, 126, 133, 139; 211/126, 128, 151, 134; 141/365, 366

[56] References Cited

U.S. PATENT DOCUMENTS

| | | | |
|---|---|---|---|
| 338,440 | 3/1886 | Raymond . | |
| 1,511,537 | 10/1924 | Strom . | |
| 1,586,295 | 5/1926 | Diehl et al. . | |
| 1,691,621 | 11/1928 | Young | 211/126 X |
| 1,971,744 | 8/1934 | Brykczynski et al. | 211/126 |
| 2,252,306 | 8/1941 | Raucci | 211/42 |
| 2,332,444 | 10/1943 | Gilley | 211/41 |
| 2,425,610 | 8/1947 | Finley | 249/126 |
| 2,493,583 | 1/1950 | Johnson | 264/297.8 X |
| 2,769,551 | 11/1956 | Just | 211/151 X |
| 2,845,780 | 8/1958 | Conklin et al. | 211/126 X |
| 3,179,730 | 4/1965 | Ingrassia | 264/245 |
| 3,332,730 | 7/1967 | Rubin et al. | 211/126 X |
| 3,465,897 | 9/1969 | Schumann et al. | 211/151 |
| 3,733,523 | 5/1973 | Reynolds et al. | 211/41 |
| 3,963,125 | 6/1976 | Baggott | 211/126 |
| 4,227,466 | 10/1980 | Rooklyn | 211/151 X |

FOREIGN PATENT DOCUMENTS

| | | | |
|---|---|---|---|
| 2495996 | 6/1982 | France | 249/126 |

*Primary Examiner*—Karen D. Kutach

*Attorney, Agent, or Firm*—Fish & Richardson

[57] ABSTRACT

A method for producing concrete paving stones includes slidably mounting paving stone molds in a vertical row in a rack; sliding one mold to a different depth in the rack; filling the mold with concrete; sliding the mold to its original position; and filling the other molds in a similar manner.

8 Claims, 6 Drawing Sheets

METHOD OF MANUFACTURING PRECAST CONCRETE ARTICLES

BACKGROUND OF THE INVENTION

The invention relates to the production of precast concrete paving stones and the like.

Concrete paving stones are typically made by placing a large number of frames (molds), often as many as 36, for the stones in long rows on a table. A wheelbarrow full of concrete is pushed up to the table next to the first frame in a row, cement is transferred from the wheelbarrow to the frame, and the wheelbarrow is then wheeled to the next frame. A person, or persons, follow behind the wheelbarrow and trowl the extra concrete off the top of each frame. The concrete is allowed to cure, the frames are removed, and the finished pavers taken from the table.

SUMMARY OF THE INVENTION

In general, the invention features, in one aspect, an improved, more efficient method for producing precast concrete articles such as paving stones According to the method, molds for the article are slidably mounted on a rack in a vertical row. One of the molds is slid to a different depth in the rack so that the opening of the mold is unobstructed by the other molds mounted in the rack, and concrete is poured into the mold. The mold is slid back to its original position, and the steps are repeated for the other molds in the rack. Preferably the method also includes the steps of leveling off excess concrete from each mold after pouring, and allowing the articles to cure in the rack.

In some preferred embodiments, the method is used to produce articles having a colored upper surface. In these embodiments, prior to pouring the concrete into the mold a layer of a coloring agent (most preferably a color substance mixed with some uncured concrete) is added to the bottom of the mold. The remainder of the mold is then filled with uncured concrete, and when the cured paving stone is removed from the mold the surface having the layer of coloring agent is used as the upper surface of the article.

The invention features, in another aspect, an improved system for molding concrete articles such as paving stones. The system includes a rack having opposing first and second vertical walls that have corresponding rails; and trays that include article molds adapted to receive concrete for curing, the trays being sized and constructed to slide on the rails. The molds preferably have a top opening.

In some preferred embodiments of the system, rails are constructed to support a tray in two positions, between which the tray can be slid. One position is for concrete curing and the other for concrete pouring. When a tray is in the pouring position and the remainder are in the curing position, at least a portion of the top opening of the mold in the tray in the pouring position is unobstructed by the other trays so that concrete can be poured in. In these embodiments, the one wall is preferably longer than the second wall so that a portion of the first wall does not have a corresponding opposing portion on the second wall and a tray in the pouring position engages for support a rail of the portion of the first wall; the first wall more preferably is at least twice the length of a tray and the second wall is at least as long as the tray.

In other preferred embodiments of the system, the rack additionally has a third vertical wall opposing the second vertical wall, and the second and third walls have corresponding rails. In these embodiments the system also includes additional trays (with molds) that are sized and constructed to slide on the corresponding rails on the second and third walls.

In other preferred embodiments of the system, the molds include a concrete bottom portion and a removable sidewall portion mounted on the bottom portion, and the system further includes different sized sidewall portions so that different sized molds can be employed on the trays.

The system and method provide an efficient, simple, inexpensive way to produce precast concrete articles. The system takes up limited space, and a wheelbarrow can be moved to one spot and left in that spot while all the molds are filled. The use of sliding trays enables one to fill one mold with minimum obstruction from the other trays. Paving stones produced according to the system and method have flat, smooth surfaces and have excellent squareness.

The invention features, in another aspect, a tray for molding concrete paving stones, including a mold adapted to receive therein a quantity of concrete for curing, the mold including sidewall portions and a concrete bottom portion. The trays provide an excellent flat surface suitable for molding concrete paving stones.

Other features and advantages of the invention will be apparent from the following description of the preferred embodiment thereof and from the claims

DESCRIPTION OF THE PREFERRED EMBODIMENT

The drawings are described first.

DRAWINGS

STRUCTURE

Referring to the Figures, concrete paving stone molding apparatus 10 includes a rack 12 and trays 14

Figure 1:
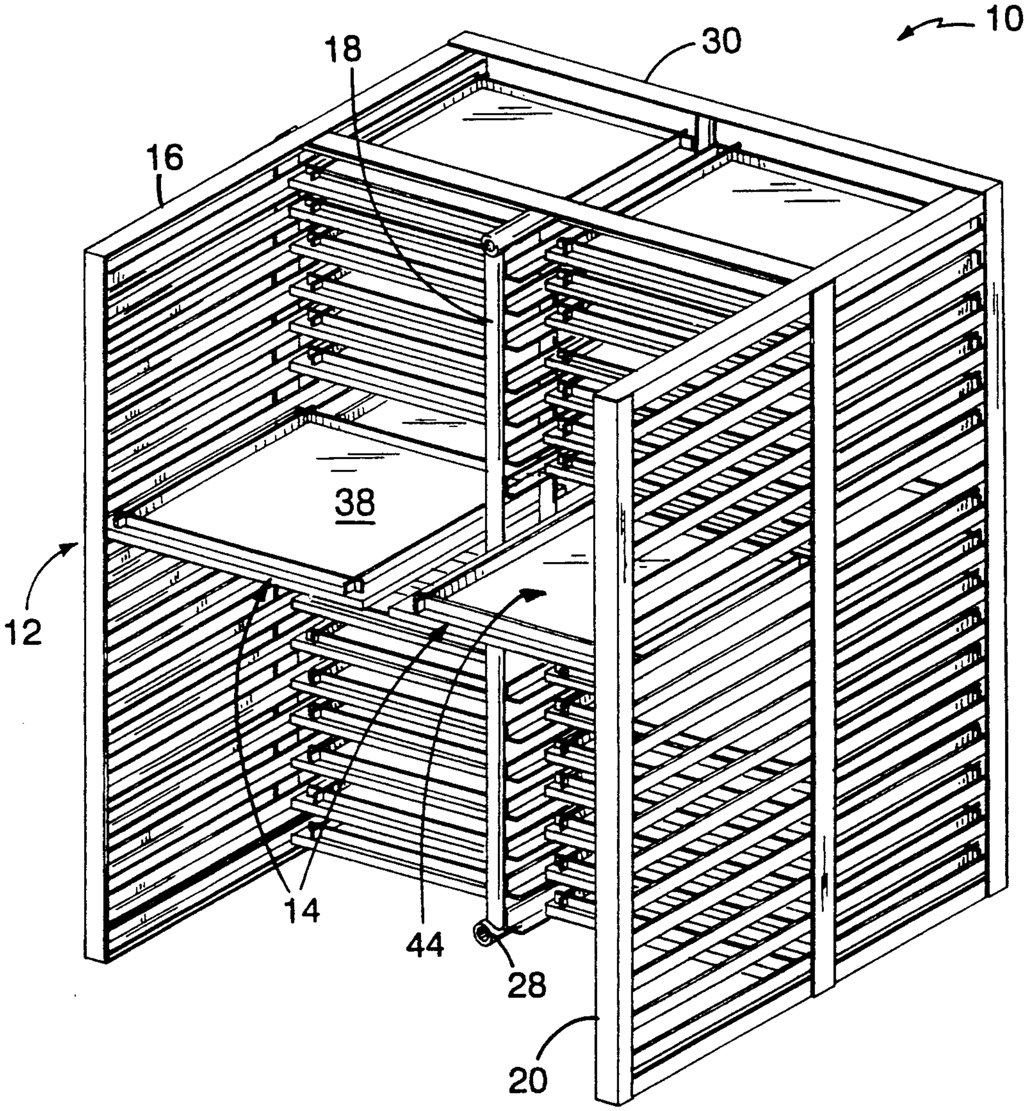
FIG. 1 is a perspective view of a preferred apparatus for casting concrete paving stones.

The rack 12 holds two side-by-side stacks of sliding trays 14 between parallel vertical walls 16, 18 and 20, as shown in FIG. 1. Middle wall 18 forms a common partition between the two sides of the rack 12 and is set back further than the outer walls so as to form an open work space.

Figure 2:
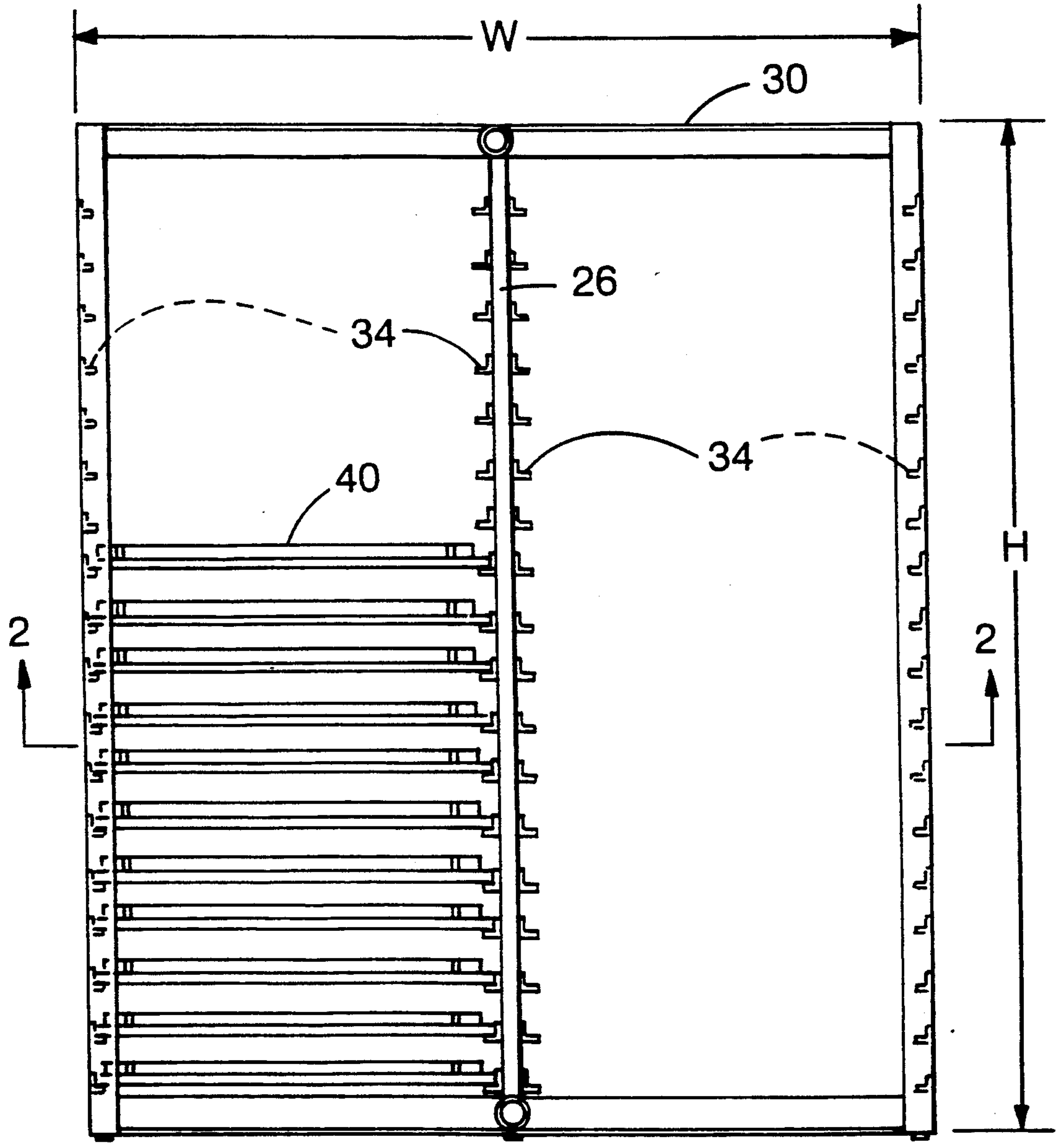
FIG. 2 is a front view of the apparatus of FIG. 1, only partially filled with trays.
Figure 4:
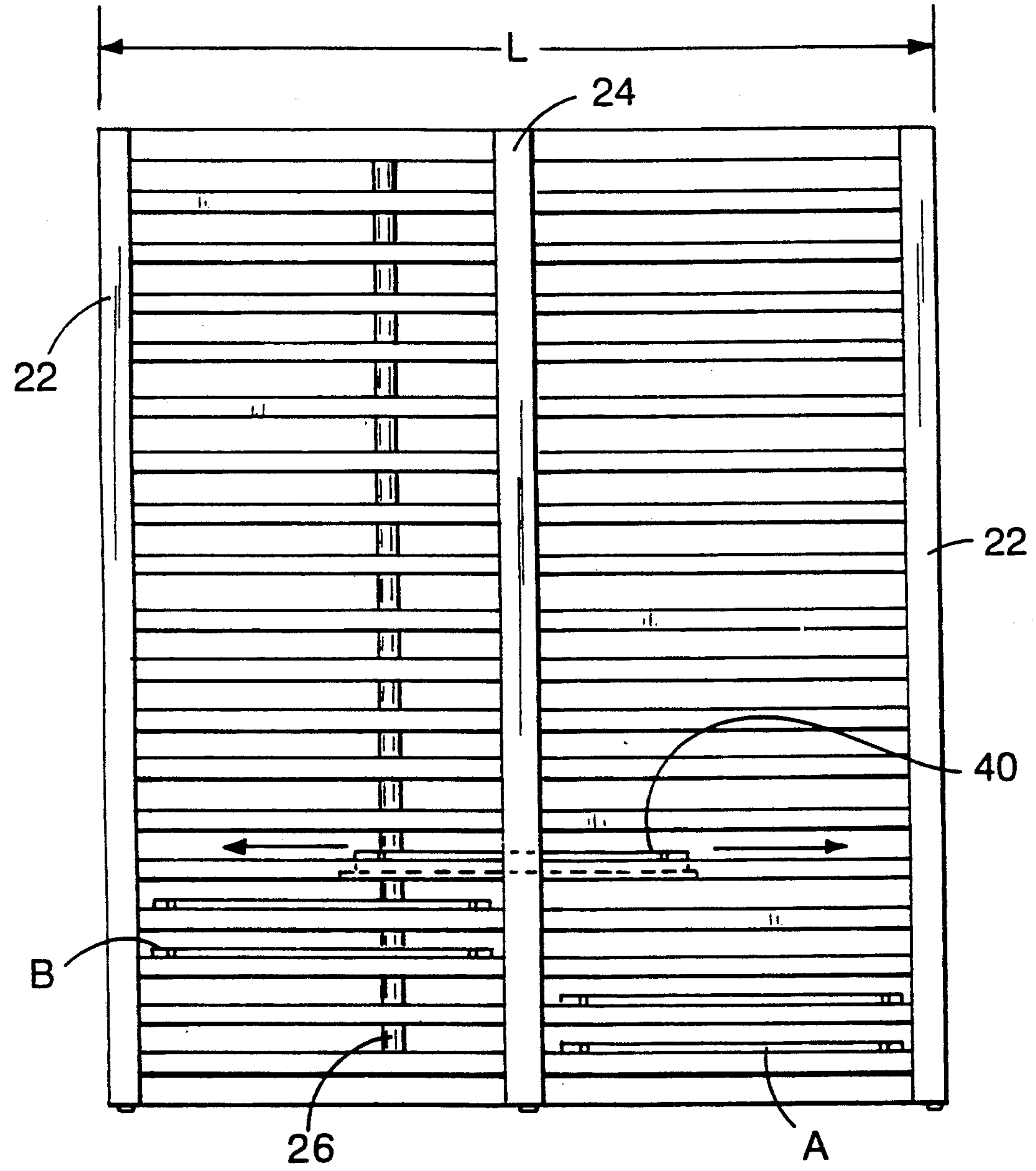
FIG. 4 is a side view of the apparatus of FIG. 1, with trays at different positions
Figure 5:
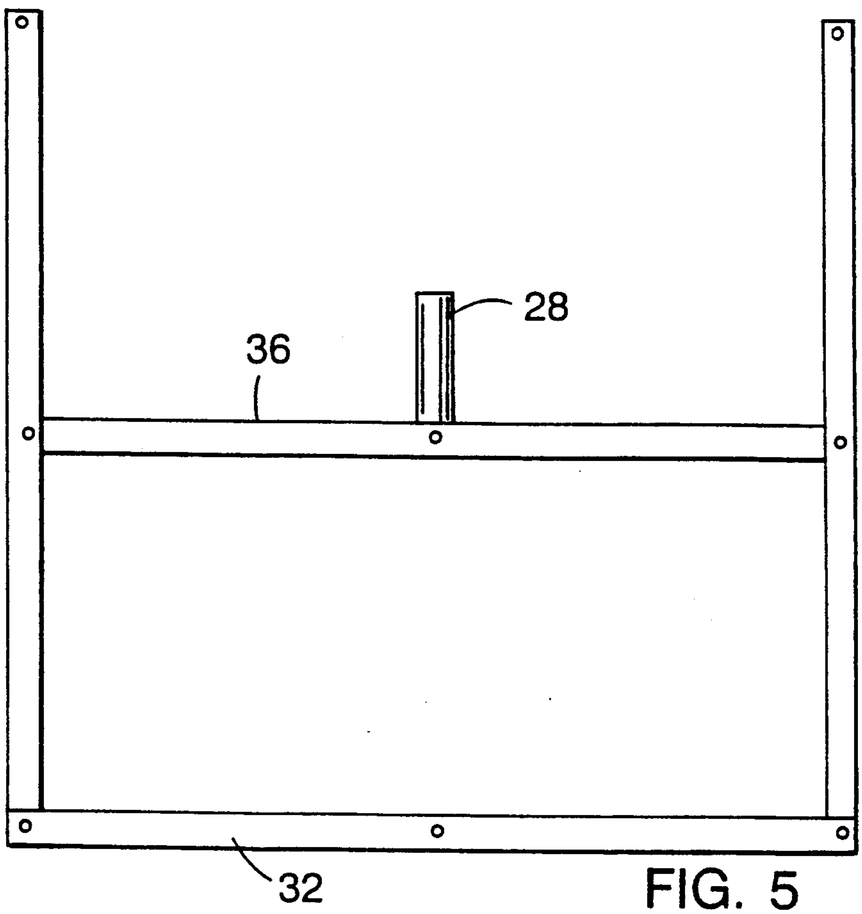
FIG. 5 is a bottom view of the apparatus of FIG. 1, with no trays in the concrete pouring position

In a preferred embodiment, rack 12 is of width W (e.g., 5′1″), depth or length L in the horizontal dimension (e.g., 5′$\frac{3}{4}$″), and height H (e.g., 6′), and has parallel vertical walls 16, 18, and 20. Outer walls 16 and 20 are defined by 2″×2″×$\frac{1}{4}$″ angled steel portions 22 and steel plate portion 24 (FIG. 4); partition wall 18 has 1" diameter tube steel portion 26 (FIGS. 2–4) and 2" diameter, 10" long tube steel portion 28 (FIG. 5). The walls are joined by upper angled steel frame portions 30 (1 ½"×1½"×¼") (FIGS. 1 and 2), and bottom angled steel frame portion 32 (2"×2"×¼") (FIG. 5). On opposing sides of walls 16 and 18 and walls 18 and 20 are corresponding pairs of horizontal rails 34 (1"×1"×⅛" angled steel) spaced 3 ½" apart, vertically, along the walls. Central width portion 36 (FIG. 5) of portion 32 is positioned at the center, lengthwise, of outer walls 16 and 20, and is connected to central tube portion 28 supporting the partition wall 18.

Figure 3:
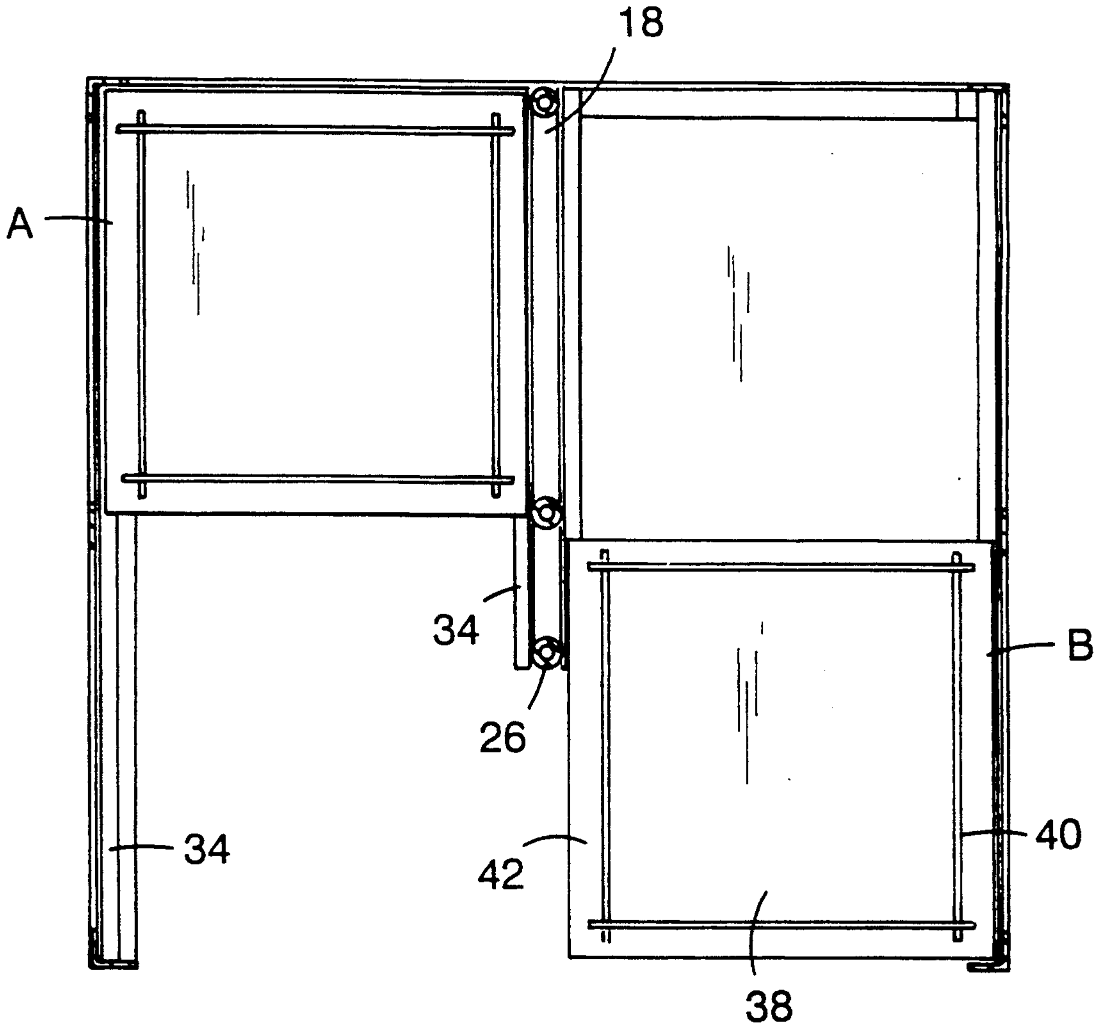
FIG. 3 is a sectional view through 2—2 of FIG. 2, with trays present in both racks.

Trays 14 (29½×29½") have a bottom portion 38 made of 1¼" plate steel. Situated about 2½" in from the edge of the trays are 1½" high removable sidewalls 40, which together with all but the outer 2½" edge 42 of the bottom portion (or floor) 38 form a mold 44. The edge 42 of each tray engages and slides freely along a pair of rails 34. Trays generally are positioned all the way in the rack in position A (the curing position); forward to position B (the pour position) (FIGS. 3 and 4).

Use

In producing paving stones with system 10, a wheelbarrow full of cement is pushed to the front of the apparatus, and a tray 14 containing an empty mold 14 is slid out to the pour position B. Because the other trays are at the fully inserted curing position, the opening to the mold to be filled is unobstructed, and a person can readily shovel, or otherwise pour, cement into the mold without interference from the other trays. Moreover, the shortness of middle wall 18 allows further unhindered maneuverability. After the mold is filled with cement, the extra cement is leveled off with a trowel, and the tray is slid back to the cure position. The process is repeated for the molds on the other trays, one-by-one in succession from bottom to top, and the cement in all the filled molds is allowed to cure. Following curing, the trays are sequentially moved to the pour position, the sidewalls removed, and finished paving stones removed from the tray.

Other Embodiments

Other embodiments are within the following claims. For example, the system can be used to produce paving stones having an upper colored surface by adding a layer of coloring agent (e.g., a color producing substance mixed with concrete) to a mold prior to adding the cement. Preferably, the colored finish cement surface layer and uncolored substrate layer are applied in a two-step batch process. Initially, the colored cement is applied to all of the molds in succession, filling first all the molds on one side of the rack and then the molds on the other side, from bottom to top Next, after pouring a batch of uncolored rough cement, the process is repeated to complete the pouring operation.

The system can include a set of sidewalls of varying sizes so that different sized paving stones can be produced using the same system.

Figure 6:
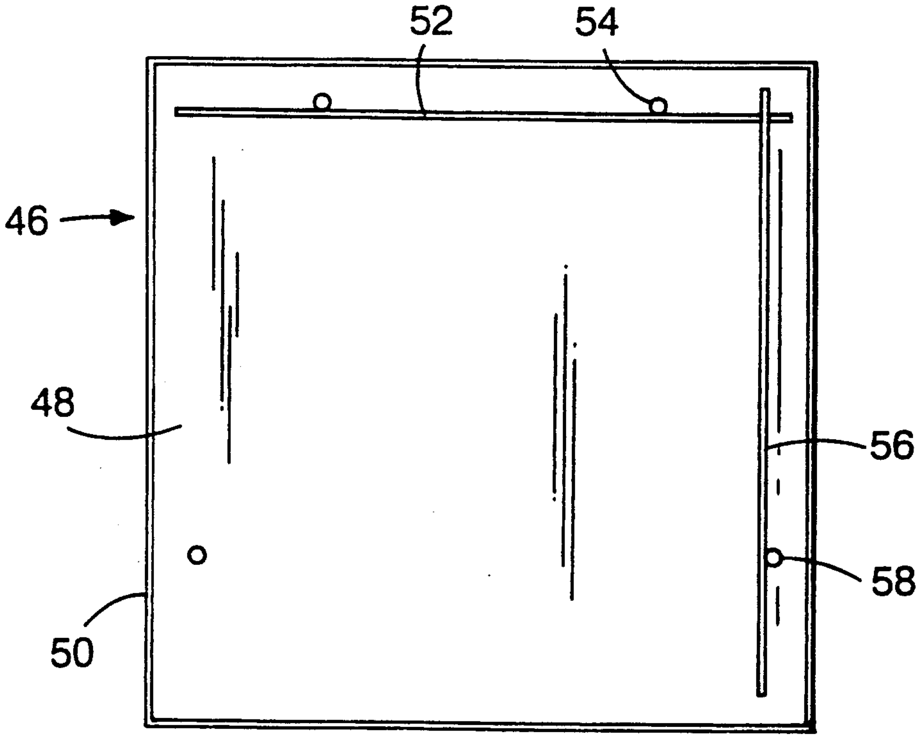
FIG. 6 is a top view of an alternate tray, minus two removable sidewalls, that can be used in the apparatus of FIG. 1.
Figure 7:
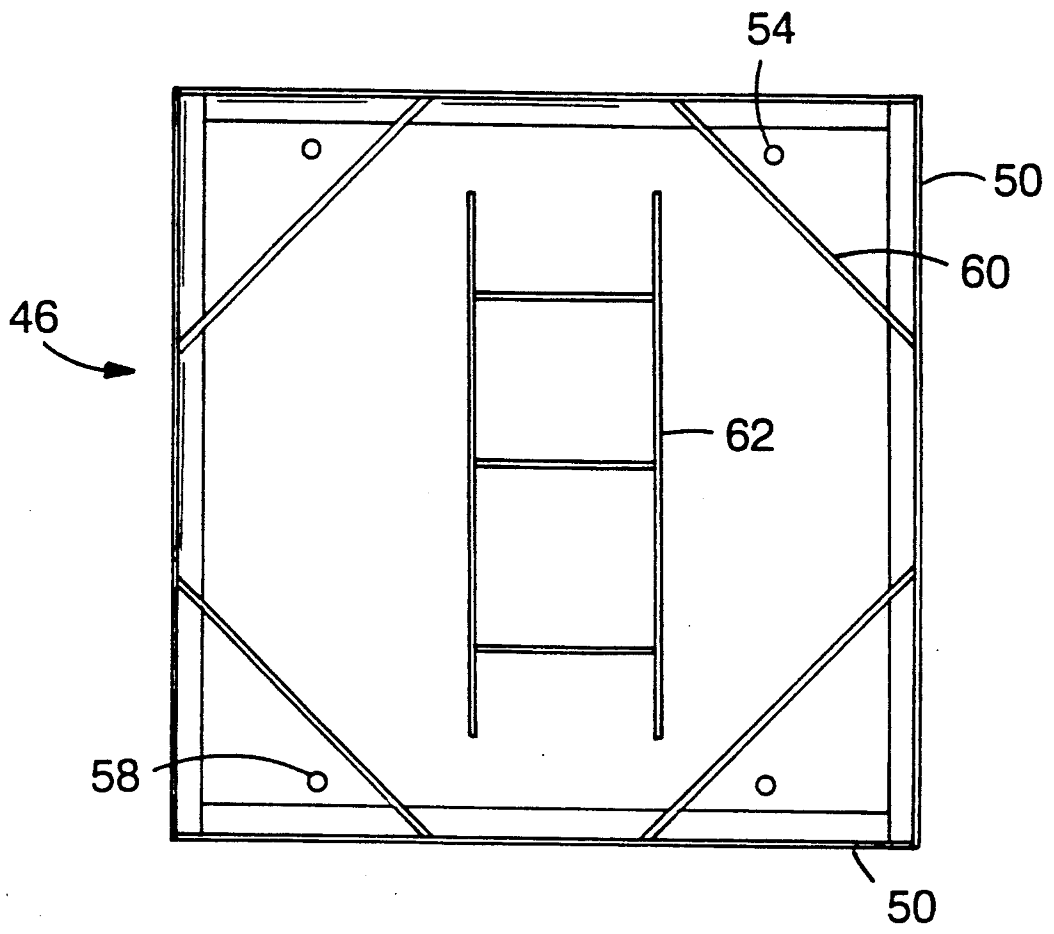
FIG. 7 is a top view of the tray of FIG. 6, minus the concrete and the sidewalls.
Figure 8:
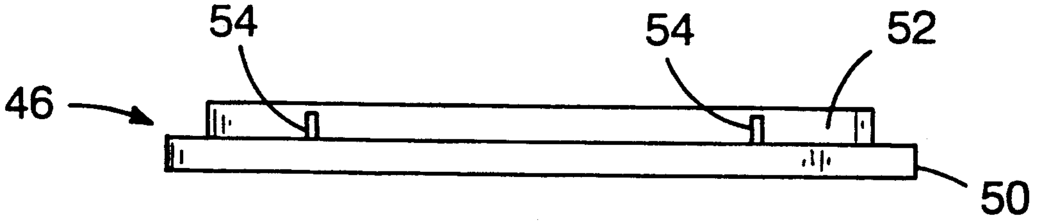
FIG. 8 is a back view of the tray of FIG. 6.

Referring to FIGS. 6–8, an alternate tray 46 that can be used in place of tray 14 has a flat concrete bottom portion 48 supported by tray walls 50 (made of 1"×1"×½" angled steel). Situated 2½" in from the edge of tray 46 is 1½" high rear wall 52, which is welded to ¼" diameter steel pins 54 that extend from bottom portion 48; and removable sidewalls 56, which are set against ¼" diameter guide pins 58 that extend from bottom portion 48. Guide pins 58 and pins 54 are 1" high. Bottom portion 48, sidewalls 56, and rear wall 52 form a mold. Welded to tray walls 50 are ¼" diameter steel support rods 60; 8" long steel ladder 62, also for support, is disposed within bottom portion 48.

Tray 46 is used with rack 12 to produce concrete paving stones in a manner analogous to that described above for trays 14; form release oil is used to ensure the release of hardened paving stones from the mold.

We claim:

1. A method for molding concrete paving stones, comprising the steps of:

(1) slidably and horizontally mounting a plurality of precast concrete article molds, each having a top opening and a bottom portion, on rails in a rack;
(2) positioning one of said molds at a first horizontal depth on said rails in said rack such that at least a portion of said top opening of said first mold is unobstructed by the other said molds;
(3) pouring uncured concrete into said first mold;
(4) sliding said first mold along said rails to a second horizontal depth in said rack for curing of said poured concrete;
(5) sufficiently supporting said first mold along an edge portion of said bottom portion of said first mold with said rails so that said first mold remains in a horizontal plane at said first depth and said second depth when said first mold contains concrete; and
(6) repeating steps (2) through (5) for each of said other molds.

2. The method of claim 1 wherein said method is for molding concrete paving stones comprising a colored upper surface, said method further comprising, between steps (2) and (3), pouring a layer of a coloring agent into said first mold.

3. The method of claim 2 wherein said coloring agent comprises a color producing substance mixed with concrete.

4. The method of claim 1 further comprising the step of leveling off excess concrete from said first mold after pouring.

5. The method of claim 1 further comprising allowing said concrete in said molds to cure.

6. The method of claim 5 wherein said molds comprise removable sidewalls, said method further comprising removing said sidewalls from said molds after said concrete has cured and removing said concrete paving stones.

7. The method of claim 1 wherein said rack comprises opposing vertical wall members comprising corresponding elements of pairs of generally horizontal, spaced-apart rails, and wherein each said mold is mounted on a said pair of rails.

8. The method of claim 1 wherein said method is for molding concrete paving stones having a colored upper surface, said method further comprising (a) pouring uncured concrete comprising a coloring agent into each said mold in accordance with steps (2) through (5), and
(b) subsequent to step (a), pouring uncured concrete into each said mold in accordance with steps (2) through (5).

* * * * *